United States Patent [19]

Keeter et al.

[11] Patent Number: 4,855,065
[45] Date of Patent: Aug. 8, 1989

[54] APPARATUS AND PROCESS TO SEPARATE AND REMOVE EXTRANEOUS MATTER FROM A LIQUID STREAM

[76] Inventors: Kathy L. Keeter; Thomas L. Keeter, both of 4200 E. Skelly Dr., Ste. 540, Tulsa, Okla. 74135

[21] Appl. No.: 261,710

[22] Filed: Oct. 24, 1988

Related U.S. Application Data

[60] Continuation-in-part of Ser. No. 133,129, Dec. 14, 1987, Pat. No. 4,780,201, which is a division of Ser. No. 225,871, Jul. 29, 1988.

[30] Foreign Application Priority Data

Aug. 11, 1988 [EP]  European Pat. Off. ......... 88307421.3

[51] Int. Cl.$^4$ ............................................. B01D 17/038
[52] U.S. Cl. .................................... 210/776; 210/788; 210/804; 210/805; 210/806

[58] Field of Search ............... 210/767, 776, 787, 788, 210/789, 800, 801, 805, 804, 806, 803, 808

[56] References Cited

U.S. PATENT DOCUMENTS 4,244,716  1/1981  Duske ................ 210/512.1
4,397,741  8/1983  Miller ................ 210/512.1

Primary Examiner—Frank Sever
Attorney, Agent, or Firm—Head & Johnson

[57] ABSTRACT

Waste water contaminents are treated and/or removed in a process and a separator that incorporates a hydrocyclone, a constrictive collection passageway for lighter materials to be removed from the water by a skimmer and skimmer ramp that effectively entrap and remove floatable contaminents while clarified water is removed from the separator at a point in the lower portion of the separator below the hydrocyclone after being aerated with recycled and aerated clarified water above the removal level in the separator vessel.

3 Claims, 8 Drawing Sheets

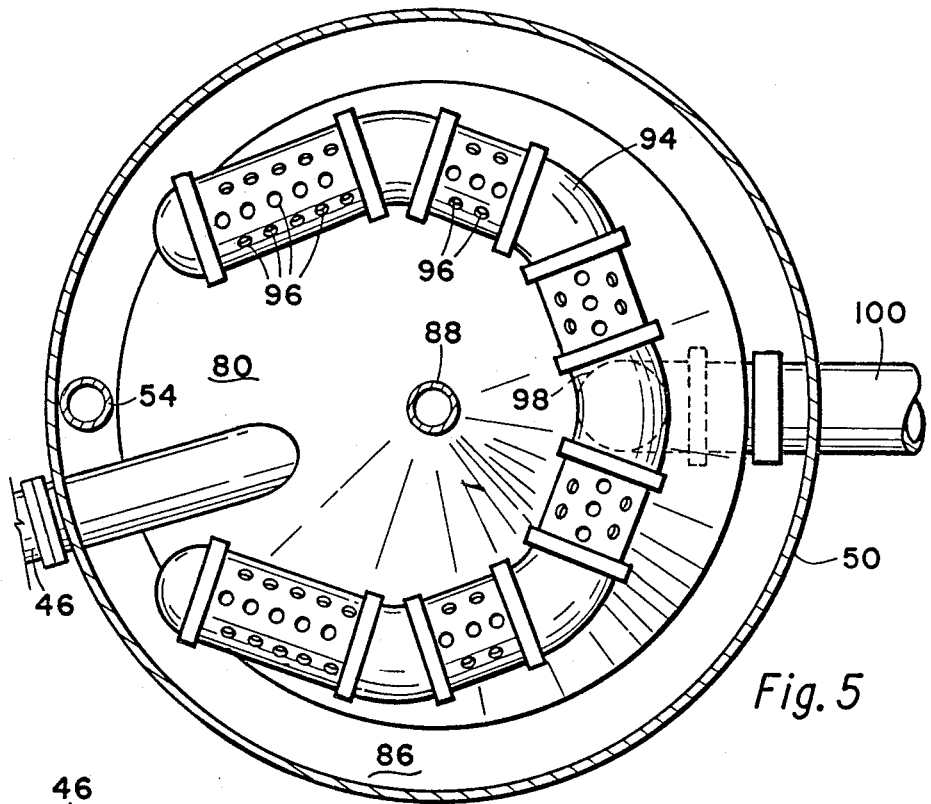
Fig. 5
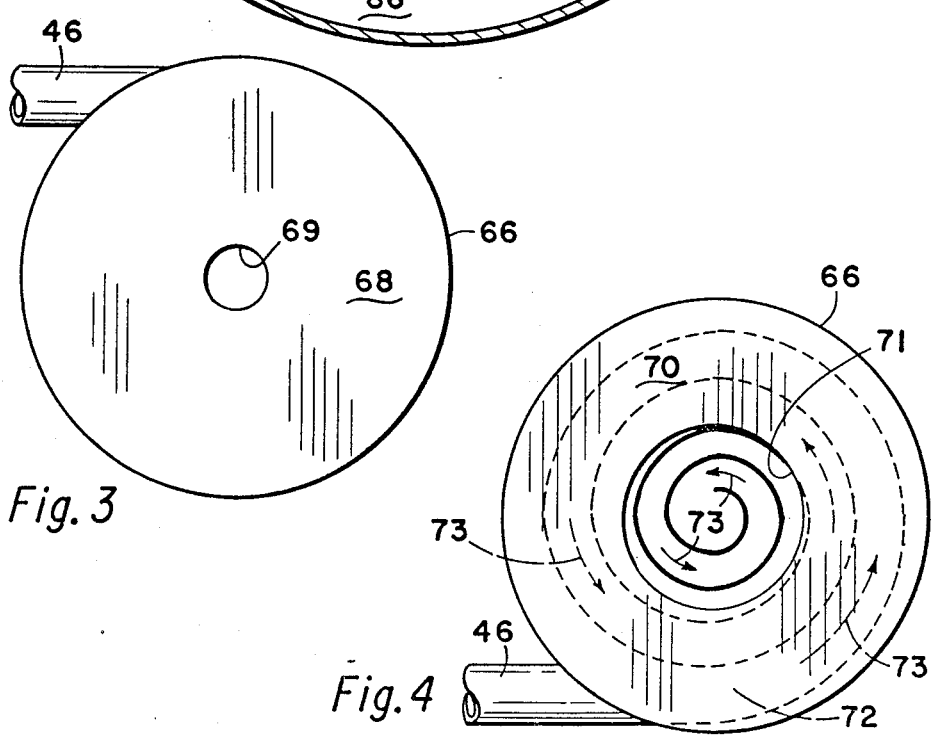
Fig. 3
Fig. 4

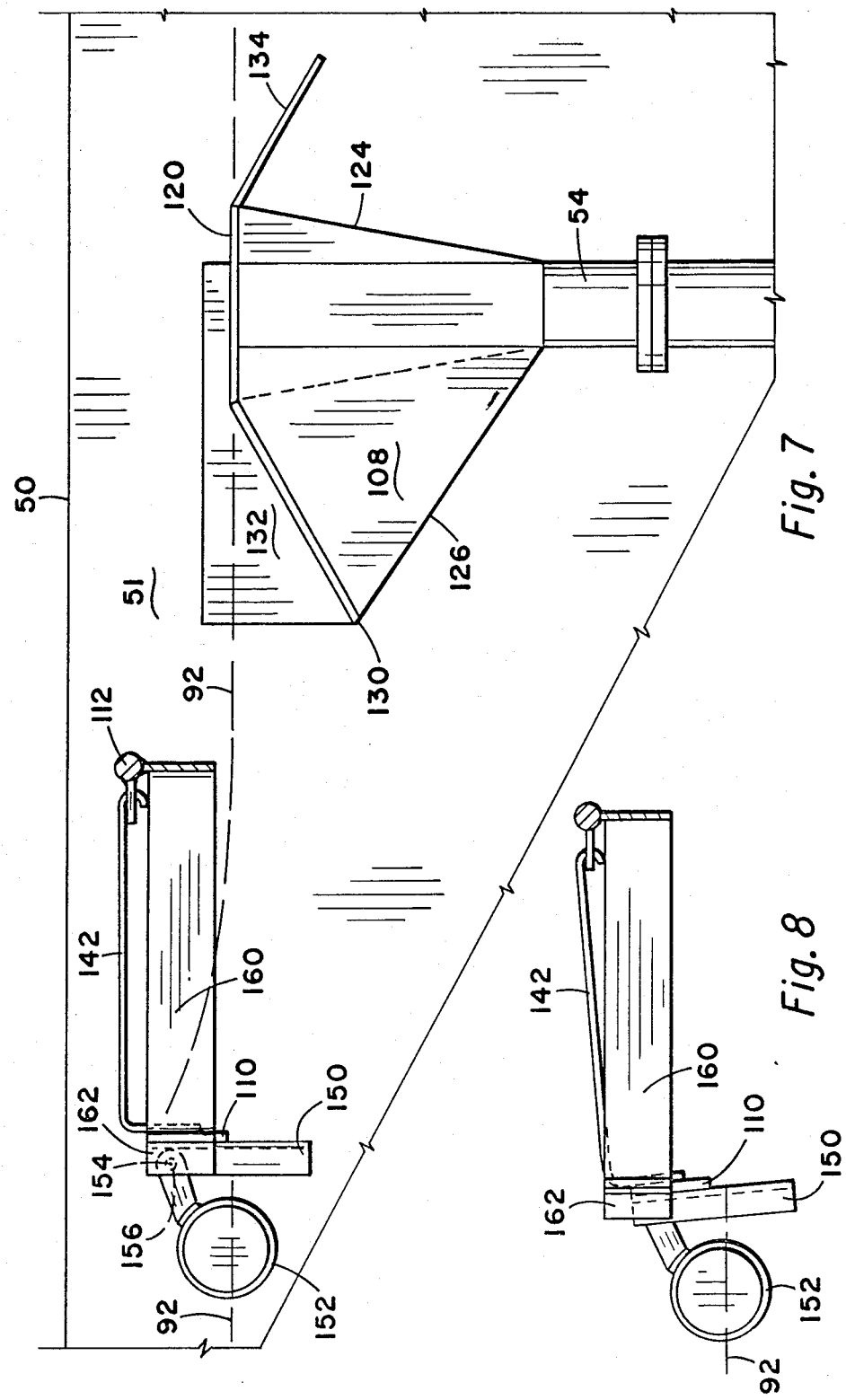

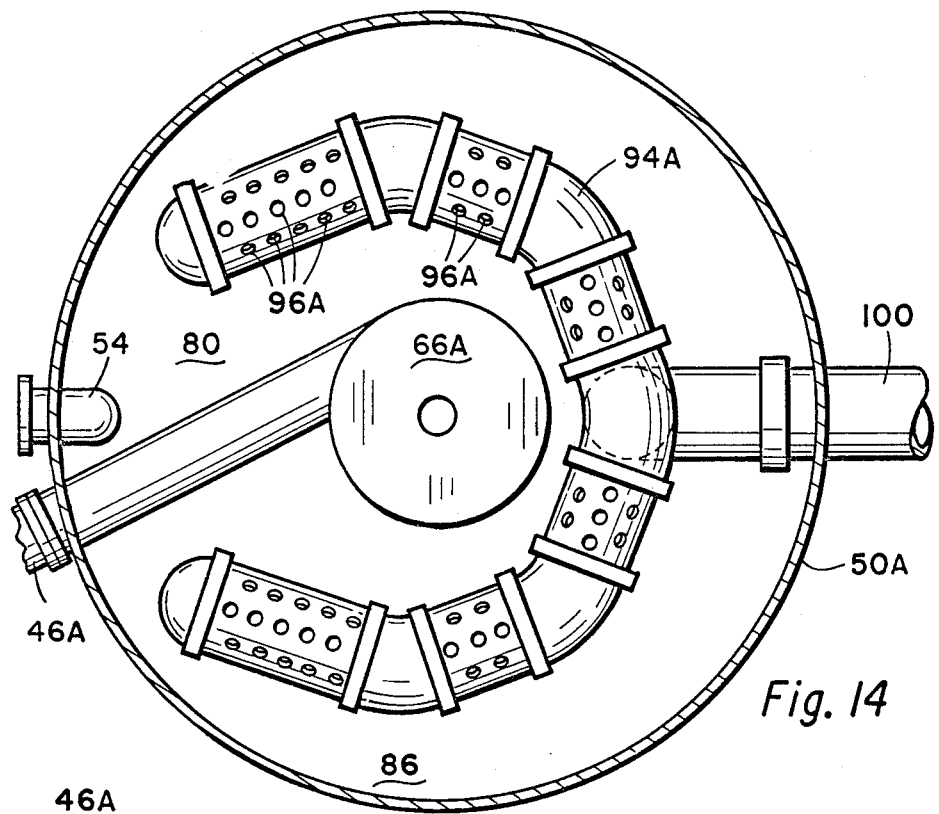
Fig. 14
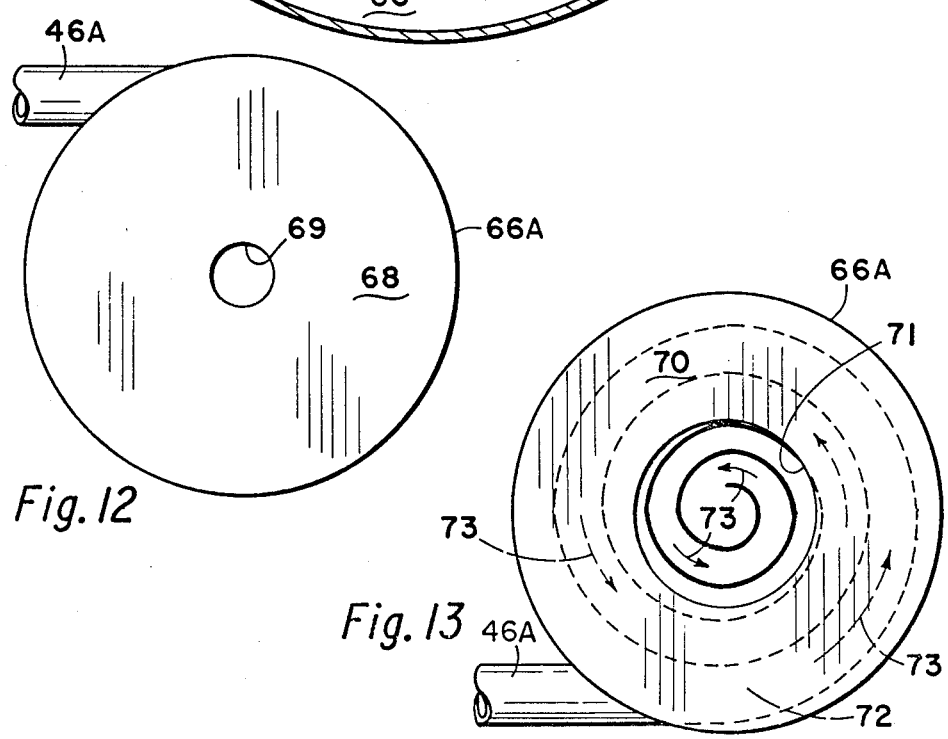
Fig. 12
Fig. 13

APPARATUS AND PROCESS TO SEPARATE AND REMOVE EXTRANEOUS MATTER FROM A LIQUID STREAM

This is a continuation-in-part of application 133,129, filed 12/14/87, now U.S. Pat. No. 4,780,201, which is a division of application 225,871, filed 7/29/88.

BACKGROUND OF THE INVENTION

The broad field of the invention is directed to the separation and removal of extraneous matter or materials from liquids.

Specifically, the field of the invention is directed to the clarification of waste water streams from industrial process plants including but not limited to meat packing, rendering, poultry processing plants and the like wherein the waste water contaminents include floatable and non-floatable materials.

SUMMARY OF THE INVENTION

This invention has for its object to provide a process and a separator apparatus capable of removing floatable and non-floatable extraneous contaminents from liquid, particularly water. Such extraneous materials include, but are not limited to hydrocarbons, oil, grease and organic matters such as lipids, amino acids, proteins, etc.

The further object of the invention is to provide a separator for removing floatable and non-floatable scum contaminents from fluent material wherein the lighter contaminents are concentrated and caused to pass directly through a collection passageway to an area where the said floatable components accumulate for removal at or adjacent a normal level maintained at the top of the separator. Clarified water is removed in the area surrounding the collection passageway, while non-clarified liquids are removed for further processing.

A further object of the invention is to provide a hydrocyclone cylinder positioned below the collection passageway wherein the hydrocyclone includes a narrow passageway wherein tangentially directed influent is caused to circulate within a sprial passageway permitting lighter components to be removed from the top of the cylinder into the collection passageway while heavier components are released from the bottom of the cylinder into the separator for subsequent removal.

A yet further object of the invention is to provide a separator having apparatus for removal of floatable scum or lighter components using collection troughs or ramps into a scum collection and removal receptable that is positioned substantially above and below the normal fluid level or scum collection and flotation zone so as to prevent pockets of unskimmable scum or floatable material.

In particular the invention is directed to a separator apparatus for removing floatable and non-floatable scum and scum-like contaminents, including solids from fluent material. The separator being comprised of an essentially vertical cylindrical vessel with a waster water influent conduit thereto. The vessel is normally filled to a given level that is maintained by a weir controlled outlet for clarified water. The influent conduit is tangentially connected to a hydrocyclone cylinder that is centrally positioned within the vessel at a point substantially at or above a quiescent lower zone created within the vessel. The hydrocyclone cylinder includes a sprial passageway therein for the centrifugal flow of the influent material outwardly to the center. The cylinder includes a top cover and a bottom cover substantially closing the cylinder except for a central opening in the top cover for release of lighter materials and a central opening in the bottom cover for the heavy contaminents. A collection passageway for the floatable or lighter contaminents, scum, etc. is comprised of an inverted conical baffle or funnel that is positioned over and substantially surrounding the hydrocyclone cylinder. The outer and lower edge of the conical baffle is of a diameter which is larger than the hydrocyclone cylinder and slightly smaller than the diameter of the separator vessel leaving an annular passageway therebetween. At the apex of the inverted conical baffle is a conduit which is in communication with the underside of the baffle, the conduit extends upwardly to a point which is typically below the normal level of the fluent material and typically at about the interface where substantially clarified water and the floatable contaminents meet. An outwardly/upwardly formed baffle can be attached to the top of the conduit. At a position between the top of the conical baffle and the top of the conduit in the space surrounding the collective passageway is a conduit to receive substantially clarified effluent which is removed from the vessel by a u-shaped siphon conduit to a weir controlled basin. The clarified effluent may be directed to further use or disposal or caused to pass, in series, through a second vessel, or recycled to the original influent stream vessel. A scum or floatable contaminent receiving and removal chamber is provided in the vessel with an outlet conduit therefrom. The top of the receiving chamber is positioned contiguous to but usually above the normal level of fluent material maintained within the vessel. The receiving chamber is constructed in combination with an upwardly sloped ramp and in such manner that the receiving chamber and the ramp extend below the normal level of the floatable contaminents with a forward edge of the ramp attached to the top of the receiving chamber. Thus, there is no collection pocket of floatable contaminent material that cannot be skimmed or removed from the vessel. A skimmer blade having a forward side and a trailing side is positioned within the vessel on a rotatable skimmer arm. The skimmer blade also includes a float that is pivotally attached to the trailing side. The skimmer arm is rotatable about a central axis by a shaft powered by an electric motor driven gear reduction driving means located outside the vessel or above the normal level of the fluent material. The skimmer blade is pivotally attached to the skimmer arm and includes resilient, flexible wiper blades which provide a substantially 'scum-tight' joint as it moves up the ramp in a trough formed as a part of the ramp as on the bottom, by the outer periphery of the vessel on one side, and an inner sidewall leading up to the top of the receiving chamber. Heavier contaminents are removed from the bottom of the vessel.

Improvements are directed to a separator vessel to be used as an alternate to the above described apparatus and/or for use in series with the aforesaid apparatus for further improved clarification of contaminated water streams. In such apparatus, the vessel does not include the collection passageway described. The hydrocyclone cylinder is reversed i.e., the outlet for the lighter constituents is directed downwardly, while the outlet for the heavier constituents is directed upwardly. A perforated outlet conduit is provided in the lower portion of the vessel to remove clarified water. A portion of the clarified water is aerated and recycled to at least one upwardly directed spray nozzle within the vessel located above the perforated outlet conduit.

The invention has for its further object the provision of a process for removing floatable and non-floatable contaminating material from a fluent and typically waste water stream, using the separator as above described.

In particular, a typical process is directed to supplying an influent stream of said contaminated fluent material to a first stage retention pit. A stream of fluent material from the retention pit may then pass through a second stage mechanical screen apparatus to remove additional solids or non-floatable materials therefrom. A stream of fluent material from the mechanical screening means may be chemically treated and mixed as needed, with e.g., ab aqueous chlorine solution. The influent stream is caused to pass into a vertical separator as above described being substantially filled with the fluent to be clarified. Additional mixing occurs in the hydrocyclone.

BRIEF DESCRIPTION OF THE DRAWINGS

FIG. 3 is a top view taken along the line 3—3 of FIG. 2.

FIG. 4 is a bottom plan view taken along the line 4—4 of FIG. 2.

FIG. 5 is a sectional view taken along the line 5—5 of FIG. 2.

FIG. 7 is a partial side plan view taken along the line 7—7 of FIG. 6.

FIG. 8 is a partial sectional view describing the operation of the skimmer blade and its adjustable float.

FIG. 12 is a sectional view taken along the line 12—12 of FIG. 11.

FIG. 13 is a sectional view taken along the line 13—13 of FIG. 11.

FIG. 14 is a sectional view taken along the line 14—14 of FIG. 11.

DETAILED DESCRIPTION OF THE DRAWINGS

Before explaining the present invention in detail, it is to be understood that the invention is not limited to its application to the details of construction and arrangement of parts illustrated in the accompanying drawings, since the invention is capable of other embodiments and of being practiced or carried out in various ways commensurate with the claims herein. Also it is to be understood that the phraseology or terminology employed herein is for the purpose of description and not of limitation.

Figure 1:
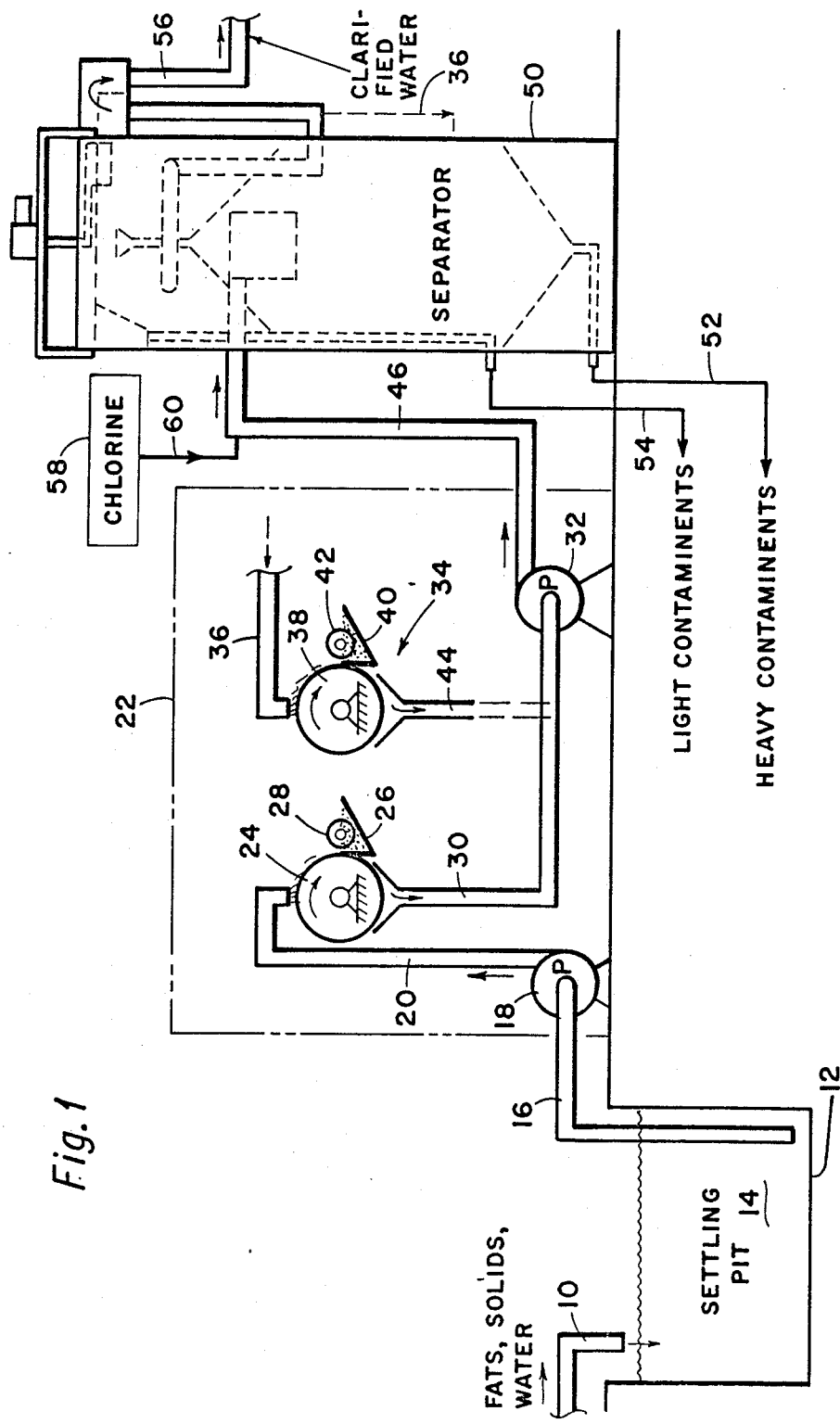
FIG. 1 is a schematic of the overall process for waste water clarification incorporating the separator of the invention.

Referring now to FIG. 1, the overall water clarification process is schematically described. An influent stream of waste water containing floatable and non-floatable contaminents is removed from the industrial process from whence it came via conduit 10 into an initial collection and/or settling pit 12 where some gravity separation can occur and where a mixer may keep the fluent stream in a blended state. The contaminated fluent material 14 within the pit is removed from the settling pit 12 by way of conduit 16 which is the inlet to pump 18, the outlet of which passes through conduit 20 to a mechanical separation area 22. The incoming stream of contaminated fluent material is caused to pass through at least one rotary drum screen 24 such as is sold by Dontech. In some instances, the stream is caused to pass through two or more rotary drum screens of decreasing mesh size opening. Of course, the size of the openings will depend upon the amount and size of fine material in the fluent stream. The fines removed from the rotary drum screen are taken to a trough 26 where they are removed by an auger 28 with the residual fluid stream passing through conduit 30 which is the inlet to a second pump 32.

In some instances, an additional rotary screen or other forms of mechanical separators of fine solid materials such as designated generally by the numeral 34 is used in the event clarified water from the separator, hereafter described, is to be recycled therefrom via conduit 36 to a rotary drum filter 38 having a trough 40 and an auger 42 for collection and removal of the fines. The residue therefrom being recycled through a conduit 44 back to the inlet 30 of pump 32. The outlet conduit 46 from pump 32 becomes the influent to separator 50 described hereinafter in greater detail. The outlets from the separator comprise a bottom circuit 52 for heavy contaminents and conduit 54 for the light contaminents while clarified effluent is removed via conduit 56 for removal as to a sanitary sewer. The clarified effluent may be directed to further use or disposal or cause to pass, in series, through a second vessel, or recycled to the original influent stream vessel. Typically aqueous chlorine (or other chemical treatment compounds as needed) from a supply container 58 is injected via line 60 into the inlet 46. The resulting reaction appears to provide some reduced interfacial tension to enable the solids and oils to separate from the influent material rapidly.

The contaminated waste water then enters the separator into a centrally located hydrocyclone cylinder 66 with the inlet entering tangentially thereto. The cylinder is substantially enclosed by a top 68 and a bottom 70 having openings therein as best shown in FIGS. 3 and 4 wherein opening 69 on the top permits the lighter contaminents to be released upwardly and outwardly therefrom while the heavier contaminents will be released downward out through opening 71. Interiorally of the hydrocyclone cylinder 66 is a spiral conduit shown largely by dotted lines having an initial opening 72 into which the tangentially directed inlet conduit 46 is in communication. The centrifuge-like flows travels outside to inside as shown by the dotted and solid lines 73. The heavier contaminents, solids and sludge-like materials are caused to drop downwardly into a relatively quiescent zone 76. A conical collection funnel 78 at the bottom of the tank permits the central collection and removal of the heavier constituents through outlet 52 for further deposal or processing.

Situated above and substantially around the hydrocyclone cylinder 66 is a hood 80 which formed of an inverted funnel having a bottom edge 82 and an open apex 84 at the top. The outer diameter of the edge 82 hood 80 is less than the inside diameter of the separator shell 50 but is greater in diameter than the hydrocyclone 66 thus forming a small annular passageway 66. The lighter material collecting beneath the hood is caused to be released through a conduit 88 which is in communication with the apex 84 of the hood 80. The conduit 88 includes an upwardly/outwardly conical baffle 90 the top end of which is typically about two feet below the normal level 92 of fluent material within the separator. Although such distance is preferable, it is largely based upon the type of floating light constituents that will collect thereabove.

Situated between the top of the hood 80 and the top of the conical baffle 90 is a clarified water receiving conduit 94. This conduit, as best shown in FIG. 5 is substantially circular or arcuate and contains a plurality of perforations 96 to receive the clarified fluent material which then passes through a u-shaped siphon-like connection having a first downward conduit 98, a bight section 100 and an upper leg 102 wherein the clarified effluent enters a connecting basin 104 having an adjustable gate or weir 106 which maintains the normal level 92. The effluent over the weir then being removed by way of conduit 56.

In the upper portion of the separator contiguous to the level 92 is a receiving chamber 108 for the light contaminents or scum that is forced thereinto by a skimmer blade 110 which is being rotated by a skimmer arm 112 driven by electric motor 114 and gear reducer 116. The light contaminents are removed from the receiving chamber 108 via conduit 54.

Figure 9:
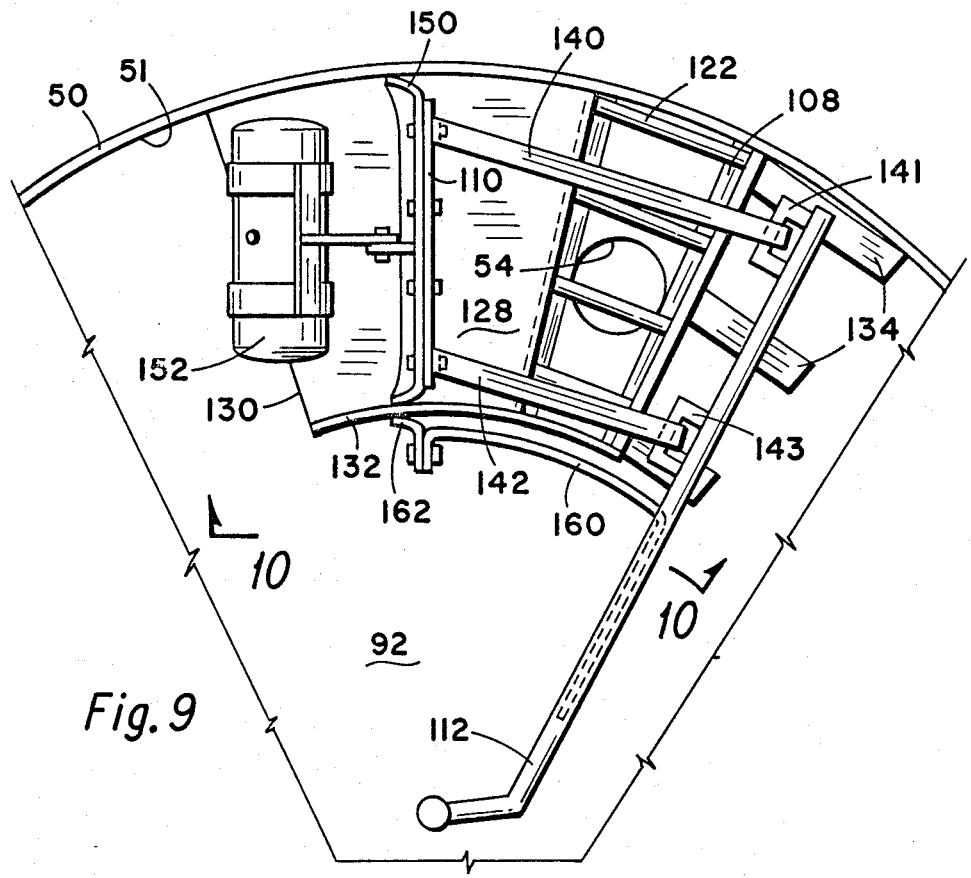
FIG. 9 is a partial top plan view describing the action of the skimmer blade as it rides across the removal trough.
Figure 10:
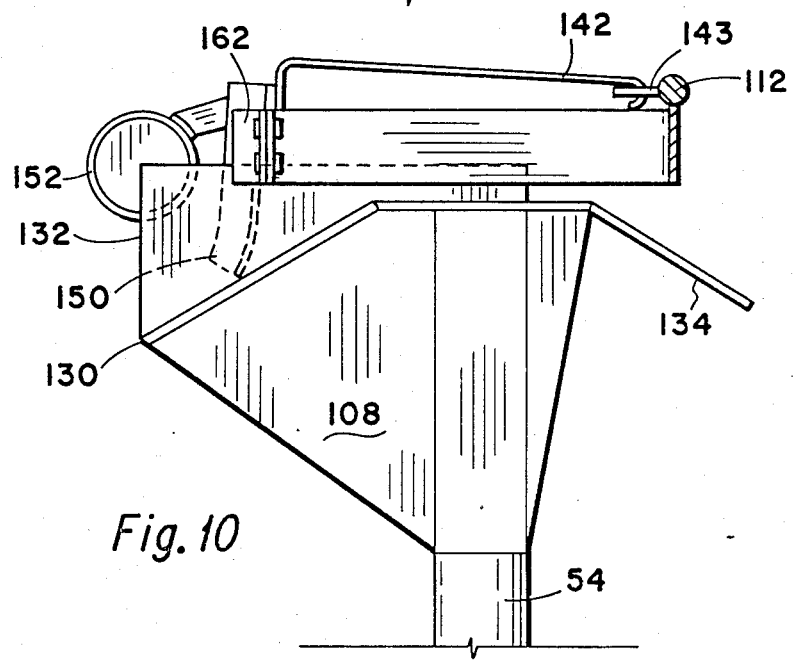
FIG. 10 is a partial plan-sectional view taken along the line 10—10 of FIG. 9.
Figure 11:
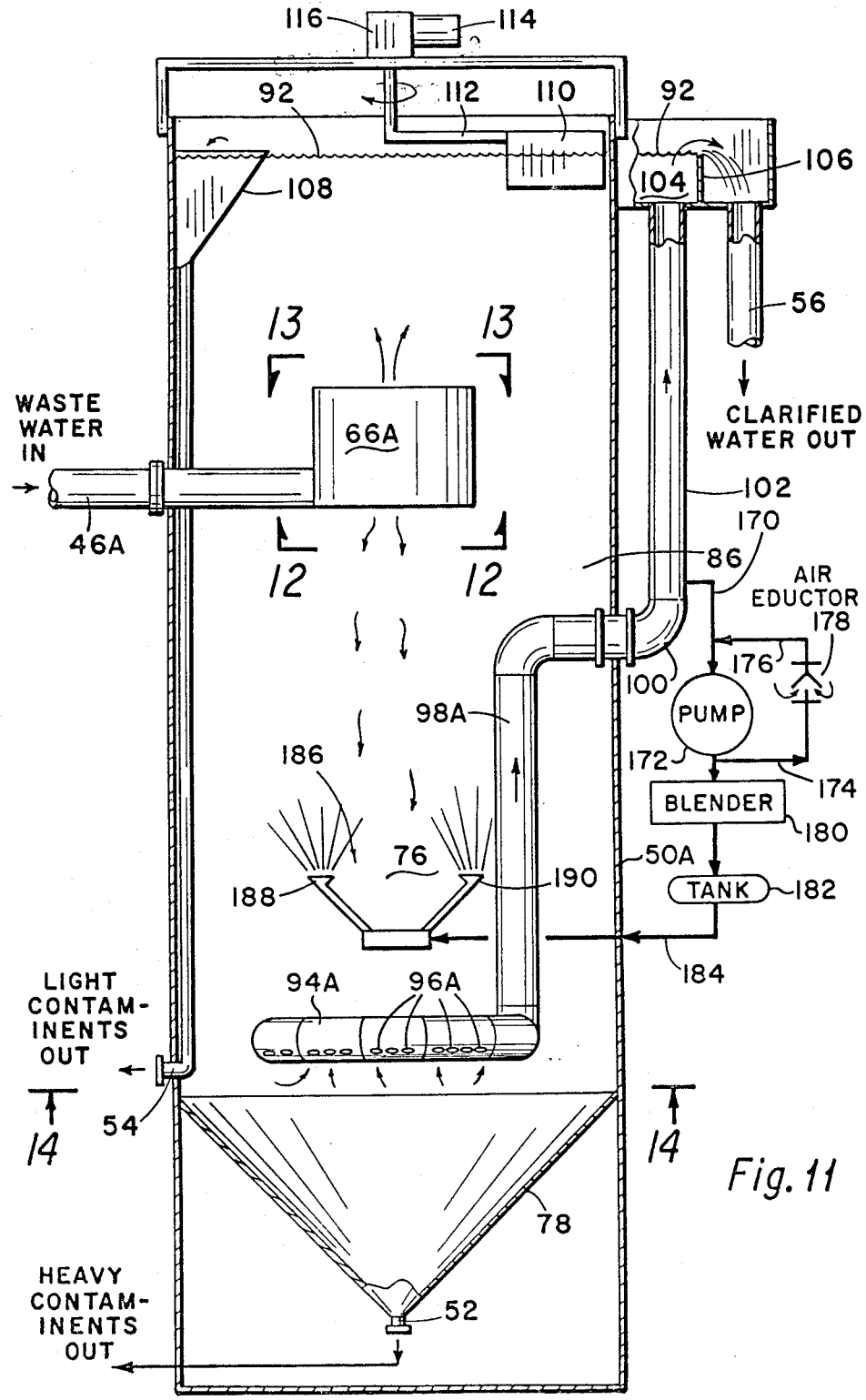
FIG. 11 is a sectional view of another embodiment of this invention.

Referring now to FIGS. 6-10, the light contaminents or scum removal system is described. The receiving chamber 108 has an open top 120 with a plurality of grates or bars 122 across which the skimmer blades 110 may pass while the light floatable scum contaminents will drop into the receiving chamber 108 for disposal via outlet conduit 54 for other treatment or disposal. The shape of the receiving chamber is formed with angular forward wall 124 and a forward angular wall 126 sloped and positioned below the normal level so as to prevent a stagnant pocket of the light constituents that would otherwise never be removed from the system. A ramp 128 is upwardly sloped from a bottom edge 130 which is preferably positioned well below the normal liquid level 92 and preferably below the normal level of floatable light constituents. The ramp forms a trough by its position adjacent the inner periphery 51 of the separator shell 50 on one side while a sidewall baffle 132 forms the inner portion of the trough thus entrapping the floatable or light contaminents for removal through the top opening 120 of the receiving chamber 108. The downstream or rearward side of the receiving chamber 108 includes one or a plurality of downwardly sloping ramp segments 134. At the other end of the rotating skimmer arm 112 are lever arms 140 and 142 which are pivotally connected to the arm at respective links 141 and 143. The other end of the lever arms are rigidly attached to skimmer blade 110. The blade includes along its periphery or at least its bottom and sides thereto a flexible wiper blade 150 which when positioned relative to ramp 128 and the formed trough, as shown in FIGS. 9 and 10 will provide a resilient seal relative to ramp 128, the vessel interior wall 51, and the inner sidewall 132. Connected to the trailing side of the skimmer blade 110 is a float 152, the pivotal axis being at 154 wherein the float may be pivotally movable upwardly or downwardly and/or retained in a give position by bolt connection 156.

An inner bar 160 is arcuately attached to the rotating skimmer arm 112 and is in such a position such that during its rotation it will pass on the inside of the arcuate sidewall 132 (see FIGS. 9 and 10). At the rearward end of the member 160 is attached a resilient seal 162 which maintains resilient contact with the resilient wiper 150 until separated by the sidewall 132.

The operation use of the process and apparatus herein is best described by the following test report:

EXAMPLE

The process described is a pretreatment system designed to remove solids and oil and grease. In removing these materials, BOD (Biological Oxygen Demand) will also be removed. The effluent from this process will be discharged to a sanitary sewer.

The wastewater produced in the plant will first pass through a 0.020 screen located in the plant. The flow will then flow to an equalization or retention basin. The flow is then pumped to a 0.010 screen and then pumped to the separator in series. Chlorine is added ahead of the separators for improved oil and grease removal.

Within the separator is a hydrocyclone separator. The hydrocyclone is a device that allows the removal of solids and oil and grease by centrifugal forces. The centrifugal forces cause the oil and grease to rise to the surface and the solids to move to the bottom of the separator. This leaves a clear water zone in between where the effluent line can be placed.

The system as shown in the drawings has been in service at a Springdale, Ark. chicken processing plant as a pretreatment system. The following results have been obtained:

|  | BOD mg/lites | TSS mg/lites | TKN mg/lites | Oil & Grease mg/lites |
| --- | --- | --- | --- | --- |
| Influent to Seperator | 1,790 | 1,700 | 151 | 1,111 |
| Effluent of Seperator | 230 | 155 | 38 | 85 |
| Percent Removal | 87 | 91 | 75 | 92 |

TSS means Total Suspended Solids
TKN means Total Kjehdahl Nitrogen

One of the major advantages of the system is that it allows the complete recycling or reclamation of all solids and oil and grease which would be attractive to industries that produce considerable oil and grease. The test produced no sludge to be otherwise disposed of by land application, landfills, or other means. Chlorine was the only chemical added and was shown to be no problem in the recycling process. During the operation at Springdale, there were no sludge problems from this plant. In addition, the user has been able to reduce its monthly municipally imposed surcharge for BOD and TSS from approximately $100,000 to zero.

Figure 2:
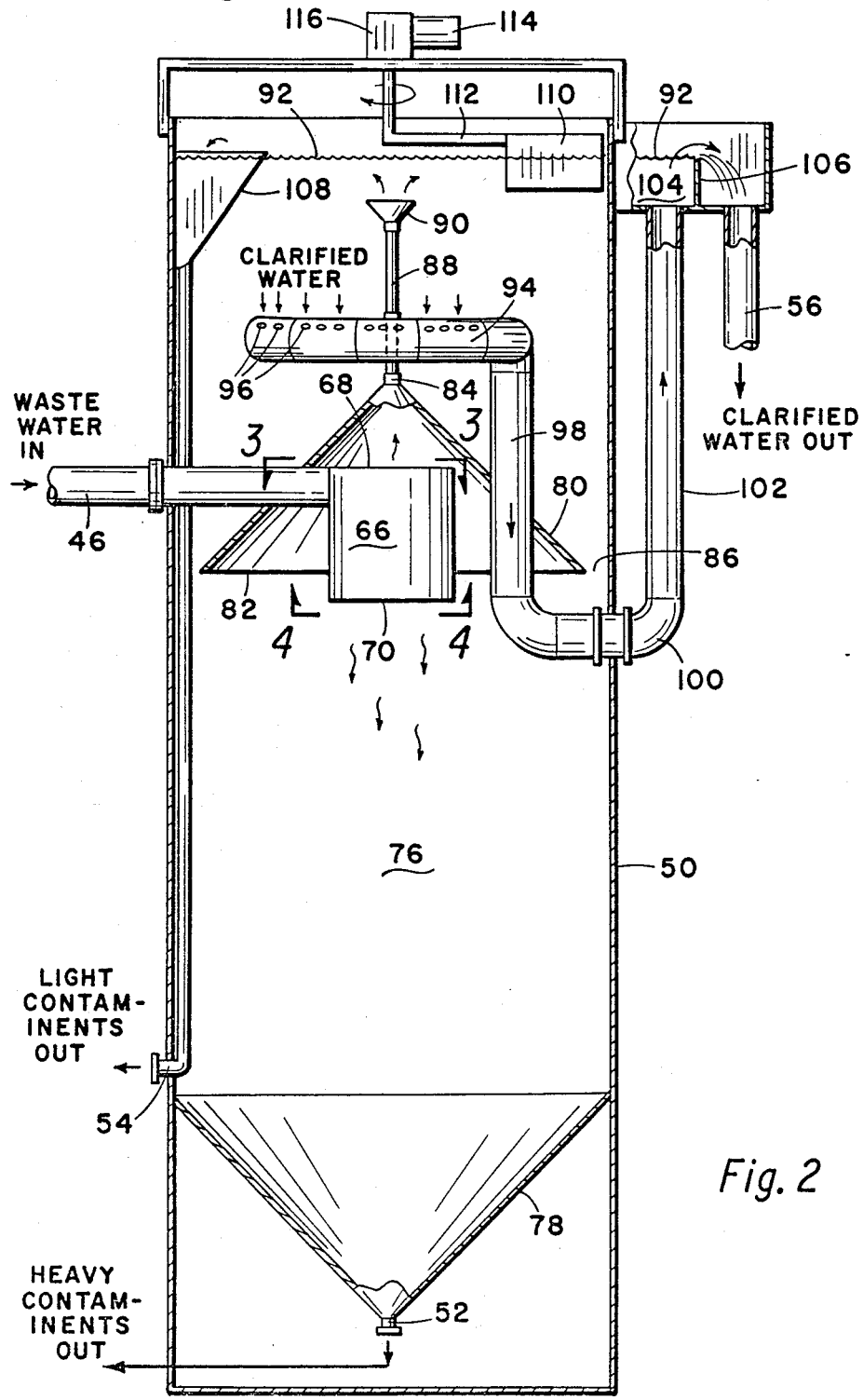
FIG. 2 is a sectional view of the separator of this invention.
Figure 6:
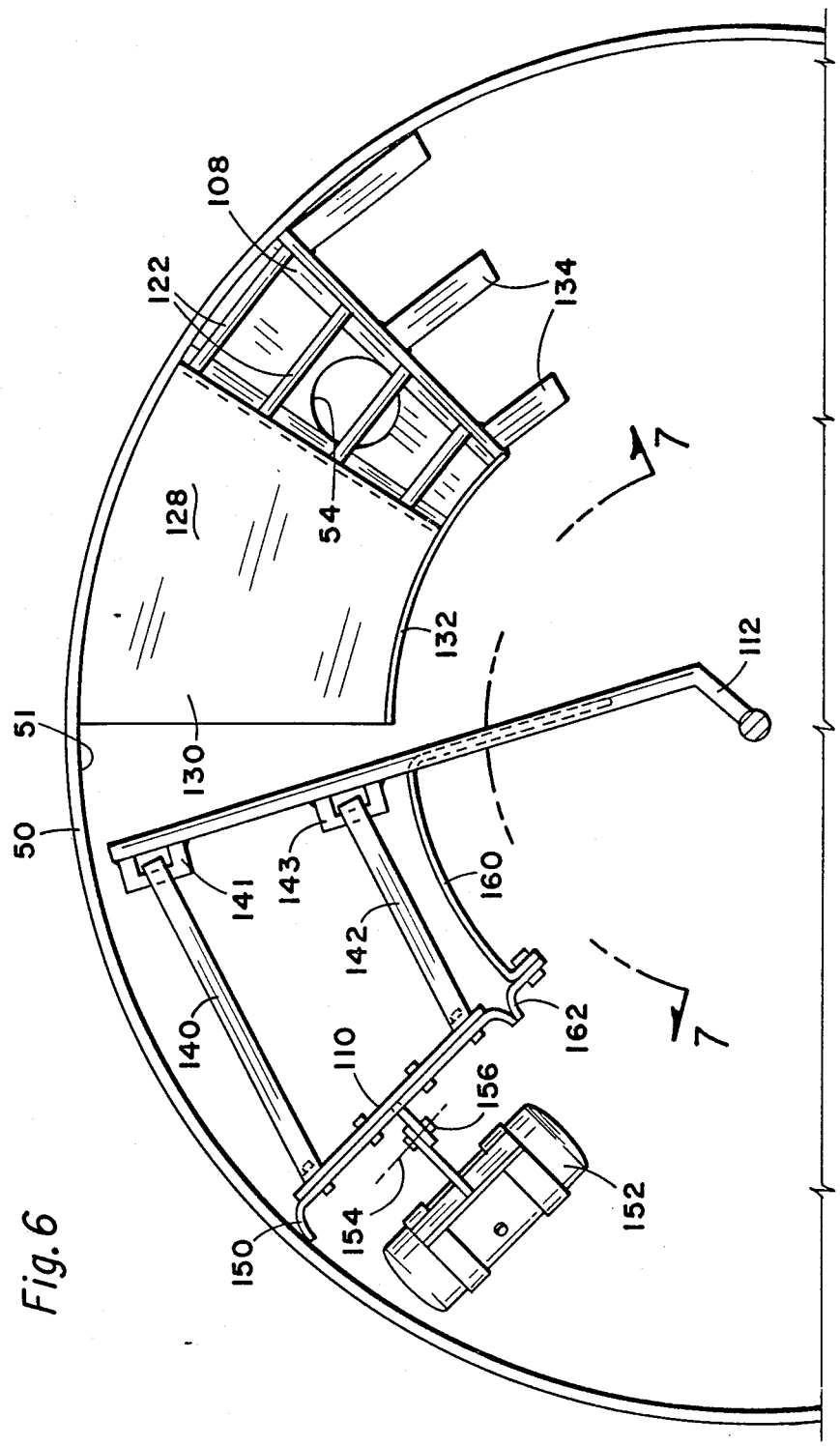
FIG. 6 is a top plan view of the skimming apparatus of this invention.

The vessel shown and identified as 50A to the embodiment described in FIGS. 11-14 in the example shown is adaptable for use either alone for the described processes, replacing the vessel shown in FIG. 2, or in some instances it is used in a series either before or after vessel 50 of FIG. 2. Like numbers and like parts which are found in vessel 50 remain in vessel 50A as shown unless specifically omitted or renumbered.

Referring now to FIGS. 11-14, the alternate separator is a substantially vertical vessel containing within the interior a hydrocyclone 66A which is adapted to accept either waste water initially or clarified water from the outlet of a preceding vessel 50 which enters vessel 50A of this improvement through conduit 46-A being tangentially directed into the hydrocyclone 66A previously described. In this embodiment, however, the hydrocyclone 66A is reversed as to the previously described embodiment wherein the bottom opening 69 is at the bottom and the larger opening 71 is at the top as shown in FIGS. 12 and 13. Other changes to the vessel interior include the location of conduit means 98A which conduit means includes a horizontally oriented conduit 94A having a plurality of perforations 96A in the lower portion thereof. The horizontally oriented portion 94A is to be located at that level where there is the greatest accumulation of clarified water. Clarified water is introduced through the perforations 96A into the conduit 98A and thence to the outlet via the same weir control system 104 and 106 as heretofore described in FIG. 2. This additional embodiment includes the recycle of a portion of the clarified water via conduit 170 using pump 172. Bypass line 174-176 includes an air eductor 178 to introduce air into the recycled water which thereafter enters blender 180 thence into pressure tank 182, conduit 184 and thence into spray nozzle means generally indicated by the numeral 186 comprising one or a plurality of spray nozzles 188 and 190. In one example of use, approximately 20% of the clarified water is recycled via conduit 170 with 2% air being added before entering the spray nozzle 188 and 190. Typically, the spray nozzles are located about two (2) feet or 0.6 meters above conduit 94A.

What is claimed:

1. Process for removing floatable and non-floatable fats and other solids from water stream comprising the steps of:

supplying said water stream to a mechanical screen means to separate any additional solids therefrom;

supplying a stream of less contaminated water from said mechanical screen means to a first vertical separator, said separator being substantially filled to a normal level with contaminated water;

providing a hydrocyclone in said first vertical separator comprised of a cylinder of substantially less diameter than said separator, a substantially quiescent zone substantially surrounding said hydrocyclone means at the bottom of said separator to remove said non-floatable contaminents, including means for enabling passage of contaminated water through a collection of passageway comprised of an inverted conical funnel having its apex open at its top, the funnel being positioned about and substantially encompassing said hydrocyclone, an upwardly extending conduit communicating with said apex of said funnel, said conduit terminating at its top with an upwardly/outwardly conical baffle, the top of said conical baffle being positioned below a normal level of liquid within said separator, a processed water receiving means positioned around said upwardly extending conduit and a siphon outlet pipe connected to said receiving means for removing said processed water from said separator;

receiving said stream of contaminated water from said second stage and tangentially directing same into said hydrocyclone;

removing said floatable materials through a receiving chamber its top opening being positioned above said normal level by rotating a floatable scraper, located above and below said level, across an upwardly sloped ramp, the bottom end of which extends below said level with its top end terminating at said top opening of receiving chamber; and supplying said processed water to a second vertical separator, said separator being substantially filled to a normal level with said processed water;

providing a hydrocyclone in said second vertical separator comprised of a cylinder of substantially less diameter than said separator, a substantially quiescent zone substantially surrounding said hydrocyclone means at the bottom of said separator to remove said non-floatable contaminents, including means for enabling passage of contaminated water through a collection passageway comprising of an inverted conical funnel having its apex open at its top, the funnel being positioned about and substantially encompassing said hydrocyclone an upwardly extending conduit communicating with said apex of said funnel, said conduit terminating at its top with an upwardly/outwardly conical baffle, the cop of said conical baffle being positioned below a normal level of liquid within said separator, a substantially clean water receiving means positioned around said upwardly extending conduit and a siphon outlet pipe connected to said receiving means for removing said substantially clean water from said second vertical separator;

receiving said stream of processed water from said first separator vessel and tengentially directing same into said hydrocyclone thence removing said floatable materials through a receiving chamber its top opening being positioned above said normal level by rotating a floatable scraper, located above and below said level, across and upwardly sloped ramp, the bottom end of which extends below said level with its top end terminating at said top opening of receiving chamber.

2. The process of claim 1 including initially supplying said water stream to a settling pit where a portion of said solids are gravity separated.

3. Process of claim 1 including the step of injecting chlorine into said stream of less contaminated water to said first vertical separator and/or into said processed water to said second vertical vessel.

* * * * *